(12) United States Patent
Guen et al.

(10) Patent No.: US 8,771,854 B2
(45) Date of Patent: Jul. 8, 2014

(54) SECONDARY BATTERY

(75) Inventors: Minhyung Guen, Yongin-si (KR);
Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 247 days.

(21) Appl. No.: 13/137,460

(22) Filed: Aug. 17, 2011

(65) Prior Publication Data

US 2012/0183817 A1 Jul. 19, 2012

(30) Foreign Application Priority Data

Jan. 14, 2011 (KR) .................. 10-2011-0003951

(51) Int. Cl.
*H01M 2/00* (2006.01)
*H01M 2/34* (2006.01)
*H01M 2/12* (2006.01)
*H01M 2/30* (2006.01)

(52) U.S. Cl.
CPC *H01M 2/34* (2013.01); *H01M 2/12* (2013.01); *H01M 2/30* (2013.01); *H01M 2/307* (2013.01); *H01M 2/345* (2013.01); *Y02E 60/122* (2013.01)
USPC ............ 429/61; 429/65; 429/78; 429/79; 429/89; 429/121; 429/122; 429/163; 429/170; 429/180; 429/181; 429/185

(58) Field of Classification Search
CPC ......... H01M 2/30; H01M 2/307; H01M 2/12; H01M 2/34; H01M 2/345; Y02E 60/12; Y02E 60/122
USPC ........... 429/61, 65, 78–81, 89, 121–122, 163, 429/170–171, 174, 180–181, 185
See application file for complete search history.

(56) References Cited

U.S. PATENT DOCUMENTS

2003/0027044 A1 2/2003 Asahina et al.
2010/0081048 A1* 4/2010 Nansaka et al. ............. 429/158
(Continued)

FOREIGN PATENT DOCUMENTS

JP 2001-357834 * 12/2001 ............. H01M 2/30
JP 2003-051303 2/2003
(Continued)

OTHER PUBLICATIONS

Korean Notice of Allowance dated Dec. 4, 2012.
(Continued)

*Primary Examiner* — Patrick Ryan
*Assistant Examiner* — Ben Lewis
(74) *Attorney, Agent, or Firm* — Lee & Morse, P.C.

(57) ABSTRACT

Provided is a secondary battery including an electrode assembly, a case accommodating the electrode assembly, a cap assembly, and an electrode terminal electrically connected to the electrode assembly. The cap assembly includes a cap plate disposed over an upper opening of the case. The electrode terminal protrudes outwardly from a terminal hole of the cap plate. The electrode terminal includes a collecting terminal extending through the terminal hole of the cap plate, a terminal plate coupled with the collecting terminal, and a coupling terminal coupled with the terminal plate. The cap plate includes a short-circuit hole therein. The short-circuit hole is at a position corresponding to a position of the coupling terminal. A short-circuit member covers the short-circuit hole.

19 Claims, 8 Drawing Sheets

(56) References Cited

U.S. PATENT DOCUMENTS

| | | |
|---|---|---|
| 2010/0227205 A1 | 9/2010 | Byun et al. |
| 2010/0279156 A1 | 11/2010 | Kim et al. |
| 2011/0039136 A1* | 2/2011 | Byun et al. ............ 429/56 |

FOREIGN PATENT DOCUMENTS

| | | |
|---|---|---|
| JP | 2003-092103 A | 3/2003 |
| JP | 2009-105075 | 5/2009 |
| JP | 2010-097822 | 4/2010 |
| KR | 10-2010-0036164 A | 4/2010 |
| KR | 10-2010-0052885 A | 5/2010 |
| KR | 10-2010-0088021 A | 8/2010 |
| KR | 10-2010-0099983 A | 9/2010 |

OTHER PUBLICATIONS

Korean Office Action dated Jun. 18, 2012.

* cited by examiner

SECONDARY BATTERY

BACKGROUND

1. Field

Embodiments relate to a secondary battery.

2. Description of the Related Art

Secondary batteries are rechargeable, unlike primary batteries. Among such secondary batteries, a low capacity battery including a battery cell in the form of a pack may be used for small portable electronic devices (such as cellular phones and camcorders), and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery may be constructed as follows: an electrode assembly formed by disposing an insulating separator between positive and negative electrode plates is placed in a case together with electrolyte; and a cap plate is disposed on the case. The electrode assembly is connected to electrode terminals which protrude from the cap plate and are exposed to the exterior of the secondary battery.

SUMMARY

Embodiments are directed to a secondary battery.

According to at least one embodiment, a secondary battery may include: an electrode assembly; a case accommodating the electrode assembly; a cap assembly including a cap plate disposed over an upper opening of the case; and an electrode terminal electrically connected to the electrode assembly and protruding outward from a terminal hole of the cap plate. The electrode terminal may include: a collecting terminal extending through the terminal hole of the cap plate, a terminal plate coupled with the collecting terminal, and a coupling terminal coupled with the terminal plate. The cap plate may include a short-circuit hole therein. The short-circuit hole may be at a position corresponding to a position of the coupling terminal. A short-circuit member may cover the short-circuit hole.

The terminal plate may be disposed at an upper side of the cap plate and may include a first hole corresponding to the short-circuit hole, and the coupling terminal may be coupled with the first hole. The terminal plate may include a lip protruding from a bottom surface of the terminal plate around a peripheral part of the first hole toward the cap plate. The coupling terminal may be coupled with the first hole by riveting or welding. The terminal plate may be formed of aluminum or an aluminum alloy. A protruding portion of the coupling terminal may protrude outward from the terminal plate, and an outer surface of the protruding portion of the coupling terminal may include a screw thread thereon.

An insulation member may be disposed between the terminal plate and the cap plate. The insulation member may include penetration holes corresponding to the terminal hole and the short-circuit hole of the cap plate.

The short-circuit member may be a deformable plate including: an edge part fixed to the cap plate; and a round part extending from the edge part and including a convex side facing an interior of the secondary battery. The round part may be configured to deform and contact the bottom side of the terminal plate when an internal pressure of the secondary battery increases to a predetermined value or higher.

The collecting terminal may include: a protrusion part passing through the terminal hole of the cap plate and protruding upwardly; and a collecting part extending from the terminal hole of the cap plate below a bottom surface of the cap plate. The collecting part may include a lower extension extending through a penetration hole of a collecting plate, the collecting plate being connected to an electrode non-coating portion of the electrode assembly. The protrusion part may be disposed within a second hole in the terminal plate at a position corresponding to the position of the terminal hole of the cap plate. The protrusion part may be formed of aluminum or an aluminum alloy, and the collecting part may be formed of copper or a copper alloy. The protrusion part and the collecting part may be electrically and physically connected to each other. The protrusion part and the collecting part may be connected to each other by friction welding.

According to another embodiment, a secondary battery may include: an electrode assembly; a case accommodating the electrode assembly; a cap assembly including a cap plate disposed over an upper opening of the case; and an electrode terminal electrically connected with the electrode assembly and protruding outwardly from a terminal hole of the cap plate. The electrode terminal may include: a collecting terminal extending through the terminal hole of the cap plate; a terminal plate coupled with the collecting terminal; and a coupling terminal coupled with the terminal plate. The cap plate may include a short-circuit hole therein. The short-circuit hole may be at a position corresponding to a position of the coupling terminal. A short-circuit member may cover the short-circuit hole. The short-circuit member may be deformable and configured to contact a bottom side of the coupling terminal in a deformed condition.

The terminal plate may include: a third hole having a position corresponding to the position of the short-circuit hole of the cap plate. The third hole may include an outwardly bending portion. A lower part of the coupling terminal may correspond in shape to the outwardly bending portion of the third hole, the lower part of the coupling terminal extending toward the cap plate. A recess may be formed in a bottom center part of the coupling terminal, and a peripheral surface of the recess may extend toward the cap plate.

The coupling terminal may be coupled with the terminal plate by riveting or welding.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
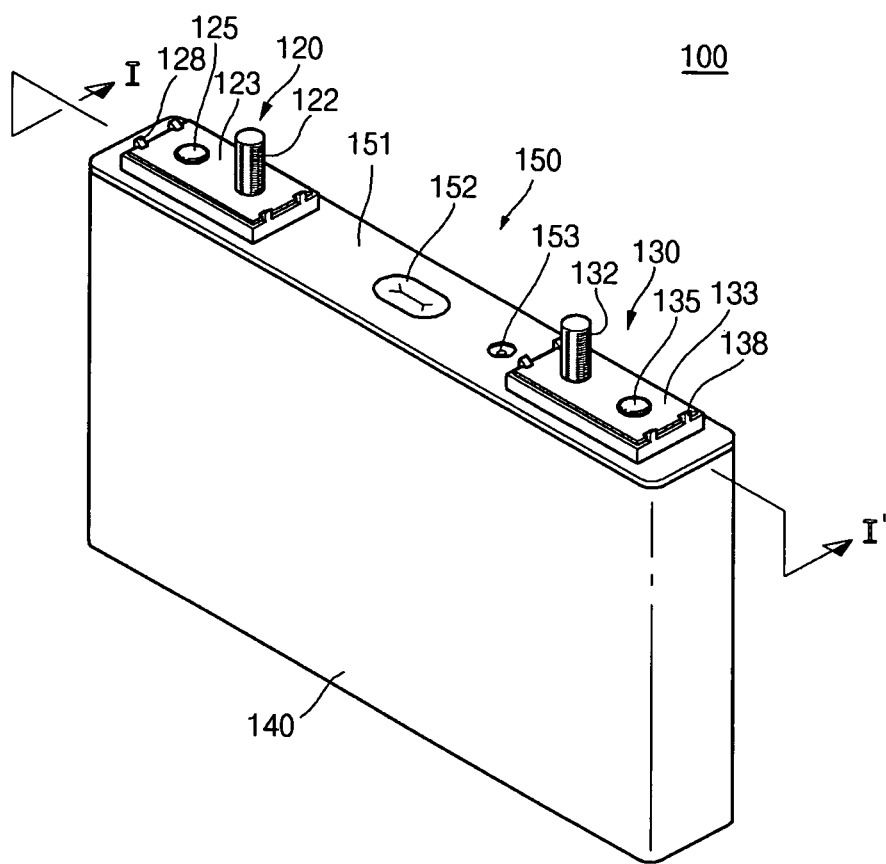
FIG. 1 illustrates a perspective view of a secondary battery according to an embodiment.

Korean Patent Application No. 10-2011-0003951 filed on Jan. 14, 2011, in the Korean Intellectual Property Office, and entitled: "Secondary Battery" is incorporated by reference herein in its entirety.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

In addition, it will be understood that when a part is referred to as being electrically connected to another part, it can be directly connected to the other part, or intervening parts may also be present.

Figure 2:
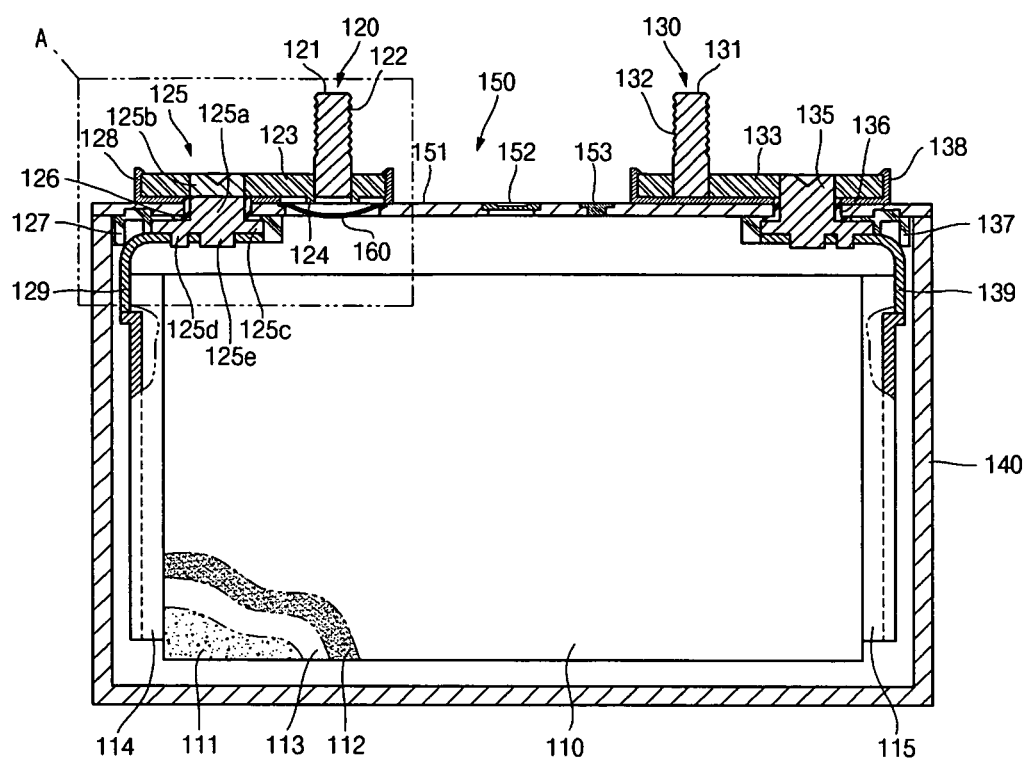
FIG. 2 illustrates a sectional view of the secondary battery depicted in FIG. 1.
Figure 3:
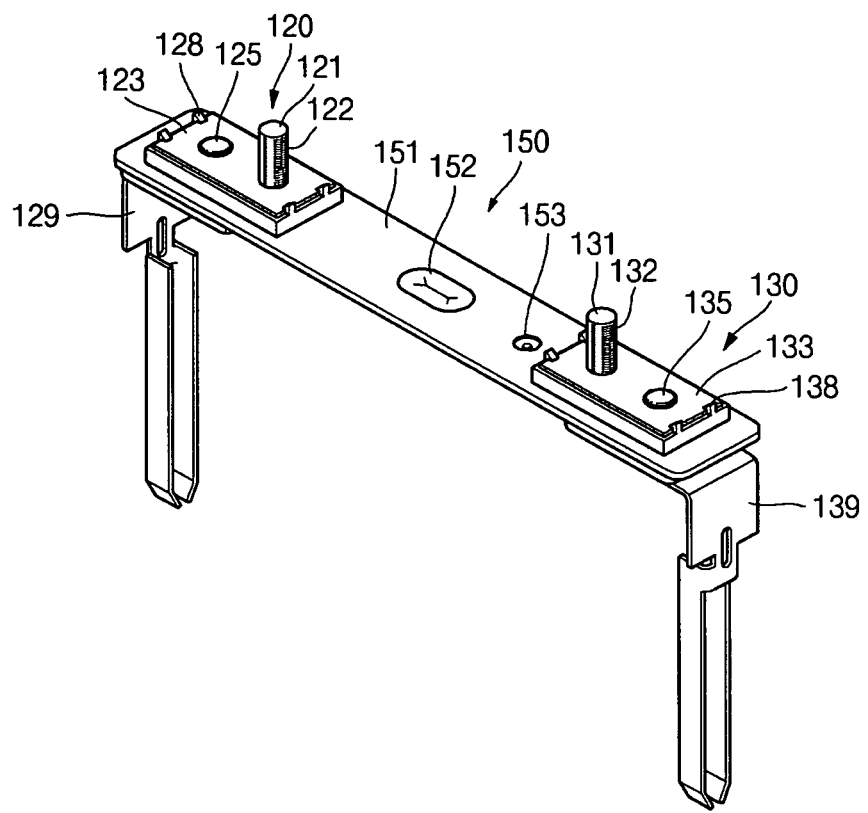
FIG. 3 illustrates a perspective view of the secondary battery depicted FIG. 1 after a case and an electrode assembly have been removed from the secondary battery.
Figure 4:
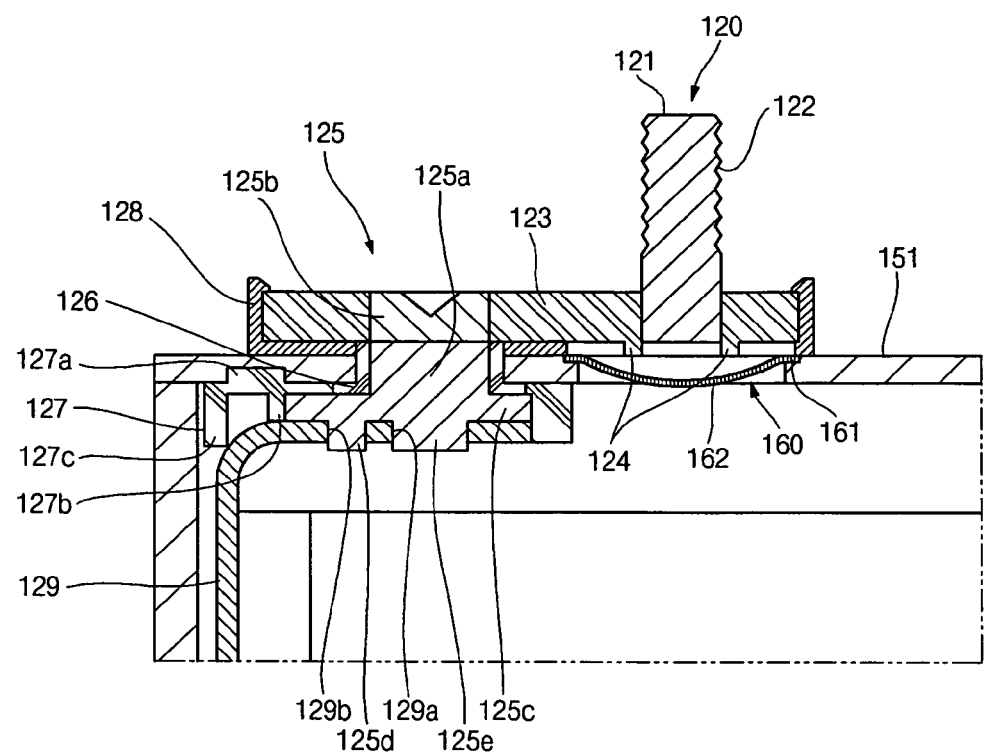
FIG. 4 illustrates an enlarged sectional view of portion A depicted in FIG. 2.

FIG. 1 illustrates a perspective view illustrating a secondary battery according to an embodiment. FIG. 2 illustrates a sectional view of the secondary battery illustrated in FIG. 1. FIG. 3 illustrates a perspective view of the secondary battery illustrated in FIG. 1 after removing a case and an electrode assembly from the secondary battery. FIG. 4 illustrates an enlarged sectional view of portion A of FIG. 2.

According to an embodiment, as shown in FIG. 1, a secondary battery 100 may include a case 140 and a cap assembly 150. The cap assembly 150 may be coupled with an upper portion of the case 140. The cap assembly 150 may include a cap plate 151, a safety vent 152 defined within the cap plate 151, and a plug 153. The secondary batter 100 may include first and second electrode terminals, 120 and 130, which extend through the cap plate 151. The first electrode terminal 120 may include a first terminal plate 123, a first collecting terminal 125, and a first upper insulation member 128. The second electrode terminal 130 may include a second terminal plate 133, a second collecting terminal 135, and a second upper insulation member 138.

Referring to FIGS. 2 through 4, the secondary battery 100 may include an electrode assembly 110 that is coupled with the first and second electrode terminals 120 and 130.

The electrode assembly 110 may be formed by winding or stacking a first electrode plate 111, a separator 113, and a second electrode plate 112, which have a thin plate or film shape. The first electrode plate 111 may function as a negative electrode, and the second electrode plate 112 may function as a positive electrode. Alternatively, the first electrode plate 111 may function as a positive electrode and the second electrode plate 112 may function oppositely, or as a negative electrode. The polarities of the first and second electrode plates 111 and 112 may be changed with respect to each other.

The first electrode plate 111 may be formed by applying a first electrode active material, such as graphite or carbon, to a first electrode collector. The first electrode collector may be formed of metal foil such as copper or nickel foil. The first electrode plate 111 may include a first electrode non-coating portion 114 to which the first electrode active metal is not applied. The materials that may be used to form the first electrode plate 111 are not limited to the above mentioned materials. A first collecting plate 129 (described in further detail below) may be coupled with the first electrode non-coating portion 114 by ultrasonic welding. The first electrode non-coating portion 114 may function as a current flow passage between the first electrode plate 111 and the outside of the first electrode plate 111.

The second electrode plate 112 may be formed by applying a second electrode active material, such as a transition metal oxide, to a second electrode collector. The second electrode collector may be formed of metal foil, such as aluminum foil. The second electrode plate 112 may include a second electrode non-coating portion 115 to which the second electrode active material is not applied. The materials that may be used to form the second electrode plate 112 are not limited to the materials specifically mentioned herein, and may include any other suitable materials. A second collecting plate 139 (described in further detail below) may be coupled with the second electrode non-coating portion 115 by ultrasonic welding. The second electrode non-coating portion 115 may function as a passage for a current between the second electrode plate 112 and the outside of the second electrode plate 112.

The separator 113 may be disposed between the first electrode plate 111 and the second electrode plate 112. The separator 113 may prevent a short circuit and may facilitate movement of lithium ions. The separator 113 may be formed of a polyethylene film or a film including polyethylene and polypropylene. The materials that may be used to form the separator 113 are not limited to the above mentioned materials.

The electrode assembly 110 may be accommodated in the case 140 together with an electrolyte. For example, the electrode assembly 110 may be substantially retained in the case 140 with the electrolyte. The electrolyte may include an organic solvent such as ethylene carbonate (EC), propylene carbonate (PC), diethyl carbonate (DEC), ethyl methyl carbonate (EMC), and dimethyl carbonate (DMC), and a lithium salt, such as $LiPF_6$ or $LiBF_4$. The electrolyte may be a liquid, solid, or gel.

The first and second electrode terminals 120 and 130 may be coupled with opposing end parts of the electrode assembly 110. According to an embodiment, the first and second electrode terminals, 120 and 130, may be electrically connected with the first and second electrode plates 111 and 112, respectively.

The first electrode terminal 120 may generally be formed of a metal or an equivalent thereof, and may be electrically connected with the first electrode plate 111. As shown more clearly in FIG. 3, the first electrode terminal 120 may include a first coupling terminal 121, the first terminal plate 123, a first collecting terminal 125, a first upper insulation member 128, and the first collecting plate 129. The first coupling terminal 121 may be connected with the first collecting terminal 125 by the first terminal plate 123.

As shown in FIG. 4, a portion of the first coupling terminal 121 may be disposed in the first hole (described in detail below) of the first terminal plate 123 and secured therein. A protruding portion of the first coupling terminal 121 may protrude above a top surface of the first terminal plate 123 by a predetermined length. An outer surface of the protruding portion of the first coupling terminal 121 may include a screw thread 122 thereon. As described in more detail below, the screw thread 122 may be inserted through a hole of a bus bar (170, see FIG. 6), and then a nut (172, see FIG. 6) may be coupled with the screw thread 122 (described in further detail below). The first coupling terminal 121 may be disposed at a position corresponding to the position of a short-circuit hole of the cap plate 151 (described in further detail below). The first coupling terminal 121 may be formed of, e.g., stainless steel. However, materials that can be used to form the first coupling terminal 121 are not limited to the materials specifically described herein.

The first terminal plate 123 may be disposed on an upper side of the cap plate 151 (described in further detail below). The first terminal plate 123 may have a substantially rectangular plate shape and may include first and second holes. The first hole may correspond in position or may be vertically aligned with the short-circuit hole of the cap plate 151. The first coupling terminal 121 may be coupled with the first hole. For example, a portion of the first coupling terminal 121 may be disposed within the first hole and secured therein. A protrusion part 125b (described in further detail below) of the first collecting terminal 125 may be inserted through the second hole. A protrusion or lip 124 may be formed along an edge of the first hole. For example, the lip 124 may protrude from a bottom surface or side of the terminal plate 123 around an outer periphery of the first hole. The lip 124 may protrude or extend toward the cap plate 151. The lip 124 may be generally positioned above the short-circuit member 160, in a position corresponding to the position of the short circuit member 160 (described in further detail below). The lip 124 may contact the upper side of the cap plate 151. When, for example, the inside or internal pressure of the secondary battery 100 increases, the short-circuit member 160 may be deformed and brought into contact with the lip 124 to cause a short circuit. The first coupling terminal 121 may be coupled with the first hole by riveting or welding. For example, the first coupling terminal 121 may be coupled with the terminal plate and secured within the first hole by riveting or welding. The first terminal plate 123 may be formed of aluminum or an aluminum alloy.

The first collecting terminal 125 may include the protrusion part 125b and a collecting part 125a.

The protrusion part 125b may be inserted through a terminal hole of the cap plate 151 and the second hole of the first terminal plate 123. The protrusion part 125b may be inserted in or disposed within the second hole such that the protrusion part 125b is disposed within the second hole. For example, the protrusion part 125b may not protrude above a top surface of the first terminal plate 123. The protrusion part 125b may be formed of aluminum or an aluminum alloy.

The collecting part 125a may be disposed at the terminal hole of the cap plate 151 and a bottom side of the cap plate 151. For example, the collecting part 125a may extend below the cap plate 151. The collecting part 125a may include a laterally extending flange 125c that abuts the bottom side of the cap plate 151 so that the collecting part 125a may not be detached or removed from the terminal hole of the cap plate 151. A protrusion or extension 125d may be formed on the bottom side of the flange 125c. The extension 125d may be inserted in or extend through the first collecting plate 129 (connected to the first electrode non-coating portion 114 of the electrode assembly 110). The collecting part 125a may be formed of copper or a copper alloy.

The protrusion part 125b and the collecting part 125a may be formed of different materials and may be connected to each other electrically and physically. For example, the protrusion part 125b and the collecting part 125a may be connected to each other by friction welding.

A seal gasket 126 may be disposed between the collecting part 125a and the terminal hole of the cap plate 151. The seal gasket 126 may seal a gap between the collecting part 125a and the cap plate 151. The seal gasket 126 may prevent permeation of moisture into the secondary battery 100 and leakage of electrolyte from the inside of the secondary battery 100.

As described in more detail below, the first coupling terminal 121 may be connected to the first collecting terminal 125 through the first terminal plate 123. Thus, the first coupling terminal 121 may not be rotated when the bus bar 170 and nut 172 are coupled with the first coupling terminal 121. Accordingly, the nut 172 may be tightened around the first coupling terminal 121 by applying a high torque. The bus bar 170 may, thereby, be coupled with the first coupling terminal 121 more securely.

A first lower insulation member 127 may be disposed between the bottom side of the cap plate 151 and the collecting part 125a to prevent a short circuit. The first lower insulation member 127 may have an upper insulation portion 127a and first and second insulation portions, 127b and 127c, which extend from opposing ends of the upper insulation portion 127a. The upper insulation portion 127a may be partially disposed within the cap plate 151. The first upper insulation member 128 may be disposed between the first terminal plate 123 and the cap plate 151. The first upper insulation member 128 may include penetration holes at positions corresponding to the positions of the penetration hole and the short-circuit hole of the cap plate 151. The first lower insulation member 127 and the first upper insulation member 128 may be formed of, e.g., polyphenylene sulfide (PPS). However, materials that can be used to form the first lower insulation member 127 and the first upper insulation member 128, are not limited to the materials specifically described herein.

The first collecting plate 129 may contact the first electrode non-coating portion 114 protruding from the outer edge or upper part of one side of the electrode assembly 110. In an implementation, the first collecting plate 129 may be welded to the first electrode non-coating portion 114. The first collecting plate 129 may generally be in the shape of a reversed L. A first hole 129a, and a second hole 129b, may be defined in an upper part of the first collecting plate 129 to receive extensions 125d and 125e of the collecting part 125a. The first collecting plate 129 may be formed of, e.g., copper or a copper alloy. However, the materials that can be used to form the first collecting plate 129 are not limited to the materials specifically described herein.

Figure 5:
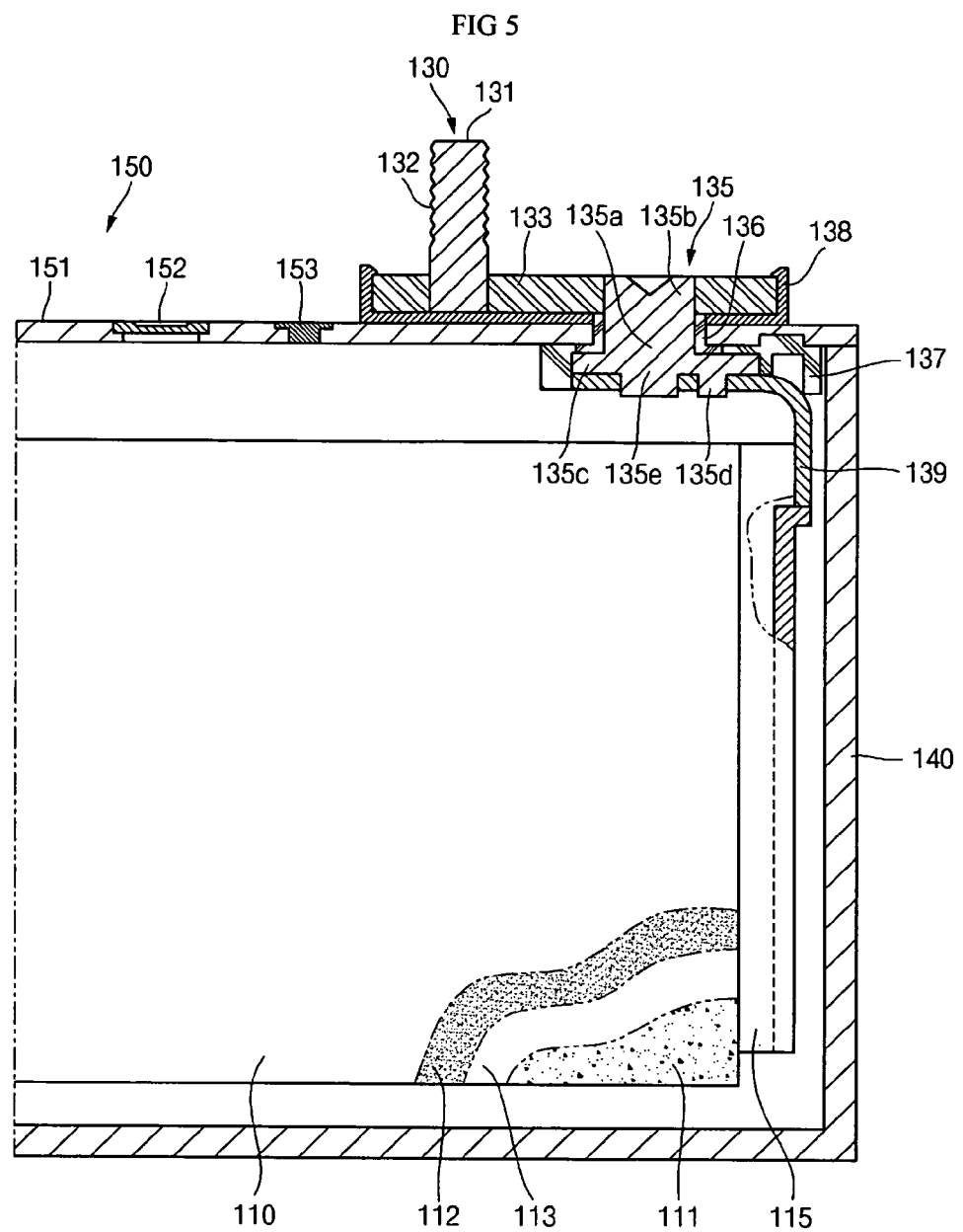
FIG. 5 illustrates a sectional view of a portion of the secondary battery depicted in FIG. 1.

FIG. 5 illustrates a sectional view of a portion of the secondary battery depicted in FIG. 1. The second electrode terminal 130 may generally be formed of a metal or an equivalent thereof, and may be electrically connected to the second electrode plate 112. The second electrode terminal 130 may include a second coupling terminal 131, the second terminal plate 133, a second collecting terminal 135, a second lower insulation member 137, the second upper insulation member 138, and a second collecting plate 139. The second coupling terminal 131, the second lower insulation member 137, and the second collecting plate 139 of the second electrode terminal 130 may have the same structure as the first coupling terminal 121, the first lower insulation member 127, and the first collecting plate 129, respectively, of the first electrode terminal 120. Thus, repeated descriptions thereof are omitted.

The second terminal plate 133, the second collecting terminal 135, and the second collecting plate 139 may generally be formed of one of aluminum, an aluminum alloy, and an equivalent thereof. According to an embodiment, the second terminal plate 133, the second collecting terminal 135, and the second collecting plate 139 may generally be formed of aluminum, an aluminum alloy, a combination thereof, or an equivalent thereof. However, the materials used to form the second terminal plate 133, the second collecting terminal 135, and second collecting plate 139, are not limited to the materials specifically described herein.

In addition, the second terminal plate 133 and the second collecting terminal 135 may be electrically connected with the cap plate 151. According to an embodiment, the case 140 and the cap plate 151 (that will be described below in detail) may have the same polarity (for example, positive polarity) as that of the second electrode terminal 130.

The second terminal plate 133 may be formed into a plate shape, and may include first and second holes. The second terminal plate 133 may have a, e.g., rectangular shape. A portion of the second coupling terminal 131 may be disposed within the first hole and secured therein. The second collecting terminal 135 (described in further detail below) may be inserted or disposed at least partially in the second hole.

The second collecting terminal 135 may be inserted through a terminal hole of the cap plate 151 and the second hole of the second terminal plate 133. For example, the second collecting terminal 135 may include a protrusion part 135b and a collecting part 135a. The protrusion part 135b of the second collecting terminal 135 may be inserted through a terminal hole of the cap plate 151 and the second hole of the second terminal plate 133. The second collecting terminal 135 may be formed of aluminum or an aluminum alloy. The second collecting terminal 135 may include a laterally extending flange 135c at the bottom side of the cap plate 151. The laterally extending flange 135c may be configured to abut the bottom side of the cap plate 151 so that the second collecting terminal 135 may not be detached from the terminal hole of the cap plate 151. A protrusion or an extension, 135d, 135e, may be formed on the bottom side of the flange 135c. For example, the collecting part 135a of the second collecting terminal 135 may extend downwardly from the terminal hole of the cap plate 151. The extension 135d may be inserted in the second collecting plate 139 connected to the second electrode non-coating portion 115 of the electrode assembly 110. The second collecting plate 139 may be formed of aluminum or an aluminum alloy. In an implementation, the second collecting plate 139 may be formed of aluminum, an aluminum alloy, a combination thereof, or an equivalent thereof.

The case 140 may be formed of a conductive metal such as aluminum, aluminum alloy, or steel plated with nickel. The case 140 may have an approximately hexahedral shape with an opening so that the electrode assembly 110 can be inserted in the case 140. The secondary battery 100 may be sealed by coupling the cap assembly 150 with the opening of the case 140. An inner surface of the case 140 may be treated to be electrically insulated from the electrode assembly 110, the first and second electrode terminals 120 and 130, and the cap assembly 150.

The cap assembly 150 may include the cap plate 151, the safety vent 152, the short-circuit hole, an electrolyte injection hole (not shown), and the plug 153.

The cap plate 151 may seal the case 140. After an electrolyte is injected through the electrolyte injection hole in the cap plate 151 of the cap assembly 150, the electrode injection hole may be closed with the plug 153. The cap plate 151 may include the safety vent 152. The safety vent 152 may have a thin thickness, and thus, if the internal pressure increases to a predetermined value, the safety vent 152 may be broken to release gas. For example, the safety vent 152 may have a thin wall or barrier that may be broken to release gas if the internal pressure increases beyond a predetermined value.

The cap plate 151 may include the terminal hole so that the collecting part 125a connected to the first collecting plate 129 may be inserted in the terminal hole. In addition, the cap plate 151 may include the other terminal hole so that the second collecting terminal 135 connected to the second collecting plate 139 may be inserted in the other terminal hole.

The short-circuit hole may be formed in the cap plate 151 at a position corresponding to the position of the first coupling terminal 121. The short-circuit member 160 may cover the short-circuit hole.

The short-circuit member 160 may include an edge part 161 and a round part 162. The short-circuit member 160 may be disposed between or in the short-circuit hole of the cap plate 151 and the first coupling terminal 121 coupled with the first terminal plate 123.

The edge part 161 may be fixed to a periphery of the short-circuit hole of the cap plate 151. The round part 162 may extend from the edge part 161 and have a deformable shape that is convex downward from the cap plate 151. For example, the round part 162 may define a convex side facing an interior of the secondary battery 100. If the inside pressure of the secondary battery 100 is increased to a set value, the round part 162 of the short-circuit member 160 may be deformed and brought into contact with a bottom side of the first terminal plate 123. For example, the round part 162 may be brought into contact with the lip 124 of the first terminal plate 123 to cause a short circuit. Then, the short-circuit member 160 and the cap plate 151 may have the same polarity.

Figure 6:
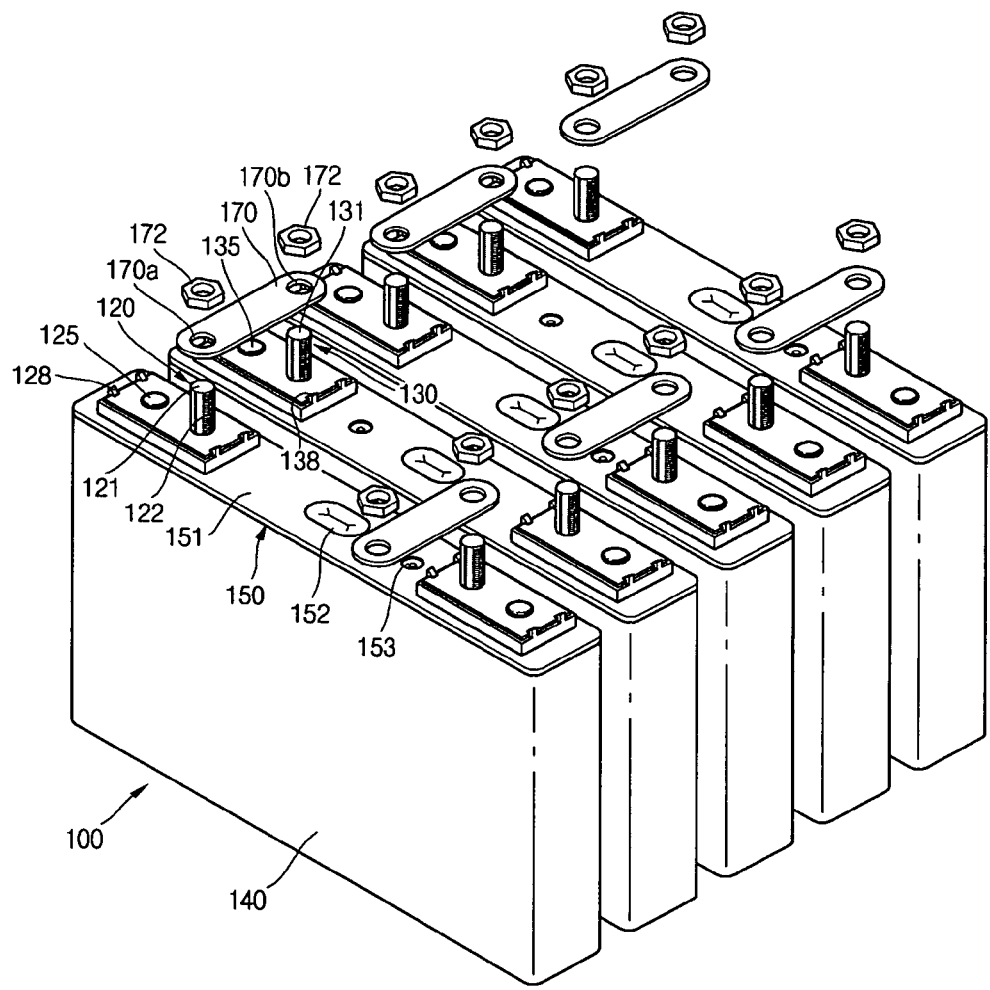
FIG. 6 illustrates a perspective view of a plurality of secondary batteries, according to an embodiment, which are coupled with bus bars.
Figure 7:
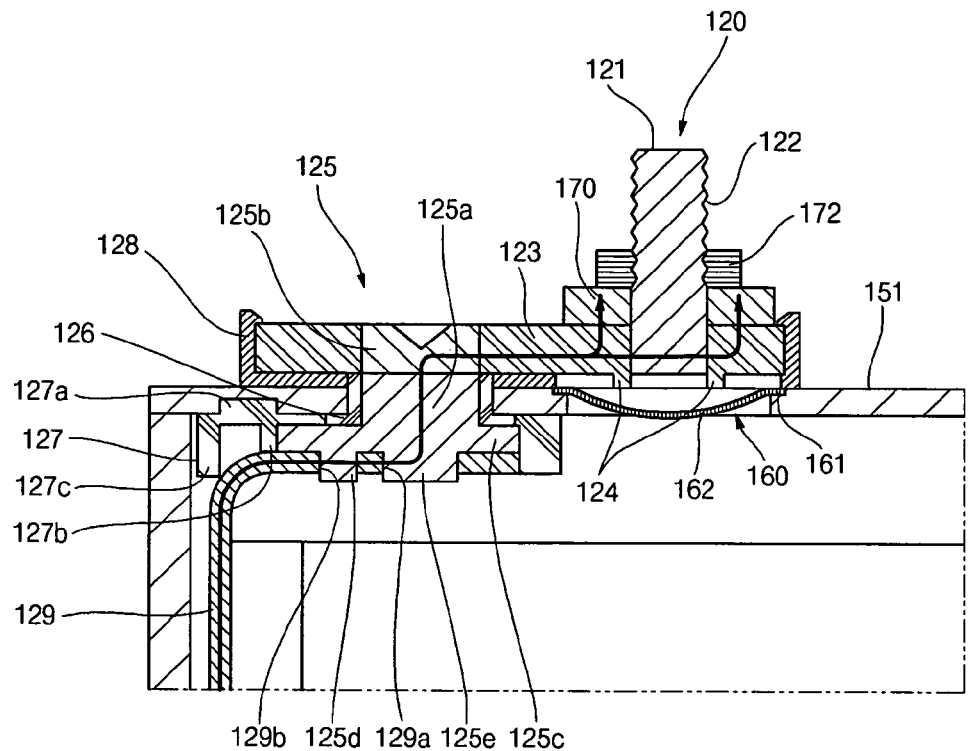
FIG. 7 illustrates a sectional view of an electrode terminal and the bus bar shown in FIG. 6, in a coupled state.

FIG. 6 further illustrates a perspective view of a plurality of secondary batteries, according to an embodiment, which are coupled with bus bars. FIG. 7 illustrates a sectional view of an electrode terminal and the bus bar shown in FIG. 6, in a coupled state.

As illustrated in FIG. 6, a plurality of secondary batteries 100 may be connected in series or in parallel with each other by using conductive bus bars 170. Penetration holes 170a, 170b, may be formed through both sides of the bus bars 170. For example, the penetration holes, 170a and 170b, may be defined in opposing ends of each bus bar 170. The first coupling terminal 121 and the second coupling terminal 131 of each of the secondary batteries 100 may be coupled with the penetration holes 170a and 170b, of the bus bars 170. Nuts 172 may be coupled with the first coupling terminal 121 and the second coupling terminal 131 by applying large torques to the nuts 172.

When the nuts 172 are disposed around the first and second coupling terminals 121 and 131, or tightened, after the bus bars 170 are coupled with the first and second coupling terminals 121 and 131, the first and second coupling terminals 121 and 131 may not be rotated. Thus, the nuts 172 may be tightened around the first and second coupling terminals 121 and 131 by applying a high torque. The bus bars 170 may, thereby, be coupled with the first and second coupling terminals 121 and 131 more securely.

Figure 8:
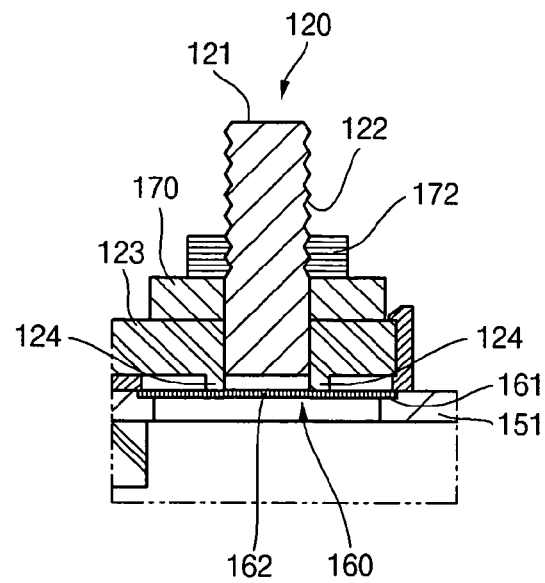
FIG. 8 illustrates a contact state between the electrode terminal and a short-circuit member, shown in FIG. 7.

According to at least one embodiment, current passages, as shown in FIG. 7, from the first and second collecting terminals 125 and 135 to the bus bars 170, may be connected through the terminal plates 123 and 133 having a relatively wide area. As such, electric resistance of the first and second electrode terminals 120 and 130 may be reduced. FIG. 8 illustrates a contact state between the first electrode terminal 120 and the short-circuit member 160. When the internal pressure of the secondary battery 100 increases, the short-circuit member 160 may be deformed and brought into contact with the lip 124 to cause a short circuit, as shown in FIG. 8.

Hereinafter, an explanation will be given of a secondary battery according to another embodiment.

Figure 9:
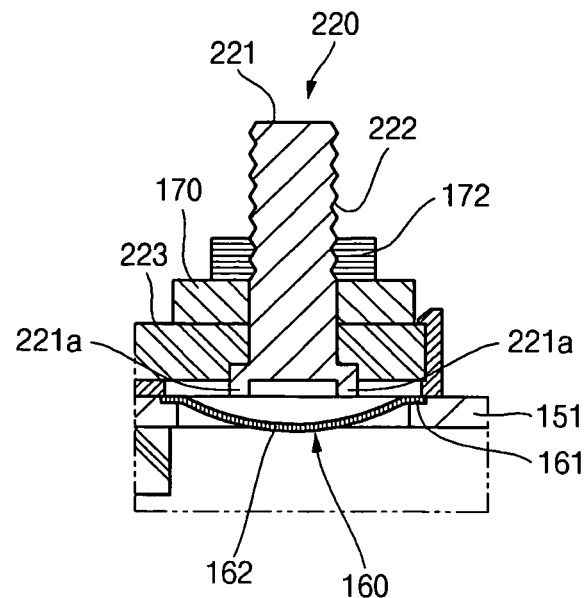
FIG. 9 illustrates a sectional view of a coupling terminal of a secondary battery according to another embodiment.

FIG. 9 illustrates a sectional view of a coupling terminal of a secondary battery according to another embodiment. The first electrode 220, shown in FIG. 9, corresponds to the first electrode 120 shown in FIG. 4, except for the features relating to the first terminal plate 123 and the first coupling terminal 121.

An embodiment of the secondary battery including the first electrode 220 may have the same structure and function as described above for the secondary battery 100 explained with reference to FIG. 4, except for the structures of the first terminal plate 123 and the first coupling terminal 121. Thus, additional drawings and explanations of the same elements will not be provided, and a first terminal plate 223 and a first coupling terminal 221 will be mainly described.

Referring to FIG. 9, a first electrode terminal 220 of the current embodiment may include the first terminal plate 223 and the first coupling terminal 221.

The first terminal plate 223 is similar to the second terminal plate 133 illustrated in FIG. 2. However, the first terminal plate 223 may include a third hole instead of a second hole, within which the first coupling terminal 221 may be disposed. The third hole may include a lower, step-shaped portion that extends to the cap plate 151. The lower portion may have a larger diameter than an upper portion of the third hole. The first coupling terminal 221 may have a bent shape at its lower part or may outwardly bending portions near its lower end, and a protrusion 221a may be defined by the outwardly bending portions of the first coupling terminal 221. The protrusion 221a may protrude toward or extend to the cap plate 151. The outwardly bending portions may correspond to the step-shape of the third hole so that the first coupling terminal 221 may not be detached from the third hole.

The cap plate 151 may include a short-circuit hole at a position corresponding to the position of the first coupling terminal 221. A short-circuit member 160 may cover the short-circuit hole. The third hole may correspond in position to the position of the short-circuit hole. If the internal pressure of the secondary battery increases to a set pressure or higher, a round part 162 of the short-circuit member 160 may become deformed and brought into contact with the protrusion 221a of the first coupling terminal 221 to cause a short circuit.

Hereinafter, an explanation will be given of a secondary battery to another embodiment.

Figure 10:
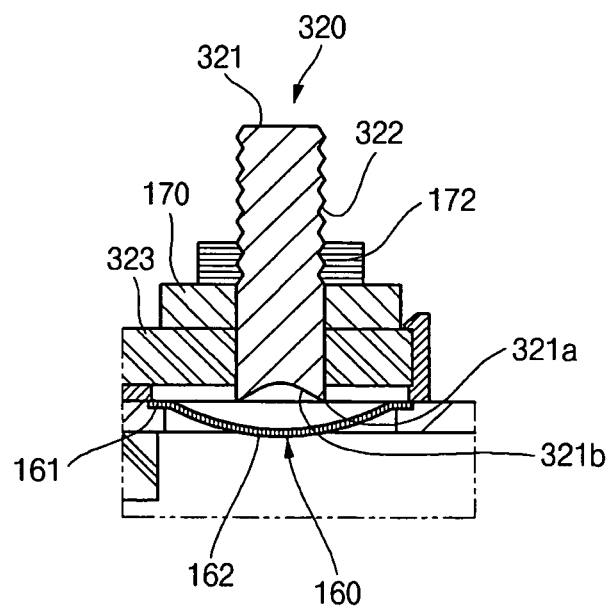
FIG. 10 illustrates a sectional view of a coupling terminal of a secondary battery according to yet another embodiment.

FIG. 10 illustrates a sectional view of a coupling terminal of a secondary battery according to yet another embodiment. The first electrode terminal 320 shown in FIG. 10 may correspond to the first electrode 120 shown in FIG. 4, except for the features relating to the first terminal plate 123 and the first coupling terminal 121.

An embodiment of the secondary battery including the first electrode terminal 320, may have the same structure and function as that of the secondary battery 100 explained with reference to FIG. 4, except for structures of the first terminal plate 123 and the first coupling terminal 121. Thus, drawings and explanations of the same elements will not be provided, and a first terminal plate 323 and a first coupling terminal 321 will be mainly described.

Referring to FIG. 10, a first electrode terminal 320, according to an embodiment may include a first terminal plate 323 and the first coupling terminal 321.

The first terminal plate 323 may have the same structure as that of the second terminal plate 133 illustrated in FIG. 2.

A recess 321b may be formed in a bottom center part of the first coupling terminal 321. A peripheral surface 321a of the recess may extend toward the cap plate. A peripheral surface 321a may be a contact surface of the first coupling terminal 321, corresponding to the periphery of the recess 321b. The peripheral surface 321a may be brought into contact with a short-circuit member 160.

A cap plate 151 may include a short-circuit hole at a position corresponding to the position of the first coupling terminal 321. The short-circuit member 160 may cover the short-circuit hole. If the internal pressure of the secondary battery increases to a set pressure or higher, a round part 162 of the short-circuit member 160 may be deformed and brought into contact with the peripheral surface 321a of the first coupling terminal 321 to cause a short circuit.

As described above, according to an embodiment, the collecting terminal and the coupling terminal may be coupled through the terminal plate so that the electrode terminal of the secondary battery may be coupled with a bus bar more securely.

In addition, since the coupling terminal of the secondary battery is coupled with a bus bar, the coupling between the secondary battery and the bus bar can be more reliable.

Further, the electrical resistance of the electrode terminals of the secondary battery can be reduced because a current may flow from the collecting terminal to a bus bar through the terminal plate.

According to another embodiment, if the internal temperature or pressure of the secondary battery is increased, the short-circuit member may be deformed and brought into contact with the terminal plate to cause a short circuit. Therefore, the secondary battery can be used more safely.

Exemplary embodiments of a secondary battery have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the present disclosure as set forth in the following claims.

What is claimed is:

1. A secondary battery, comprising:
   an electrode assembly;
   a case accommodating the electrode assembly;
   a cap assembly, the cap assembly including a cap plate disposed over an upper opening of the case; and
   an electrode terminal electrically connected to the electrode assembly and protruding outwardly from a terminal hole of the cap plate, the electrode terminal including a collecting terminal extending through the terminal hole of the cap plate, a terminal plate coupled with the collecting terminal, and a coupling terminal coupled with the terminal plate; wherein:
   the cap plate includes a short-circuit hole therein, the short-circuit hole being at a position corresponding to a position of the coupling terminal,
   and a short-circuit member covers the short-circuit hole.

2. The secondary battery as claimed in claim 1, wherein:
   the terminal plate is disposed at an upper side of the cap plate and includes a first hole corresponding to the short-circuit hole, and
   the coupling terminal is coupled with the first hole.

3. The secondary battery as claimed in claim 2, wherein the terminal plate includes a lip protruding from a bottom surface thereof around a peripheral part of the first hole and toward the cap plate.

4. The secondary battery as claimed in claim 2, wherein the coupling terminal is coupled with the first hole by riveting or welding.

5. The secondary battery as claimed in claim 1, wherein the terminal plate is formed of aluminum or an aluminum alloy.

6. The secondary battery as claimed in claim 1, wherein:
   a protruding portion of the coupling terminal protrudes outwardly from the terminal plate, and
   an outer surface of the protruding portion of the coupling terminal includes a screw thread thereon.

7. The secondary battery as claimed in claim 1, further comprising an insulation member between the terminal plate and the cap plate.

8. The secondary battery as claimed in claim 7, wherein the insulation member includes penetration holes corresponding to the terminal hole and the short-circuit hole of the cap plate.

9. The secondary battery as claimed in claim 1, wherein the short-circuit member is a deformable plate including:
   an edge part fixed to the cap plate; and
   a round part extending from the edge part, the round part defining a convex side facing an interior of the secondary battery.

10. The secondary battery as claimed in claim 9, wherein the round part is configured to deform and contact a bottom side of the terminal plate when an internal pressure of the secondary battery increases to a predetermined value or higher.

11. The secondary battery as claimed in claim 1, wherein the collecting terminal includes:
    a protrusion part passing through the terminal hole of the cap plate and protruding upwardly; and
    a collecting part extending from the terminal hole of the cap plate below a bottom surface of the cap plate,
    wherein the collecting part includes a lower extension extending through a penetration hole of a collecting plate, the collecting plate being connected to an electrode non-coating portion of the electrode assembly.

12. The secondary battery as claimed in claim 11, wherein the protrusion part is disposed within a second hole in the terminal plate at a position corresponding to the position of the terminal hole of the cap plate.

13. The secondary battery as claimed in claim 11, wherein:
    the protrusion part is formed of aluminum or an aluminum alloy, and
    the collecting part is formed of copper or a copper alloy.

14. The secondary battery as claimed in claim 11, wherein the protrusion part and the collecting part are electrically and physically connected to each other.

15. The secondary battery as claimed in claim 14, wherein the protrusion part and the collecting part are connected to each other by friction welding.

16. A secondary battery comprising:
    an electrode assembly;
    a case accommodating the electrode assembly;
    a cap assembly including a cap plate disposed over an upper opening of the case; and
    an electrode terminal electrically connected with the electrode assembly and protruding outwardly from a terminal hole of the cap plate, the electrode terminal including:
       a collecting terminal extending through the terminal hole of the cap plate,
       a terminal plate coupled with the collecting terminal, and
       a coupling terminal coupled with the terminal plate;
    wherein the cap plate includes a short-circuit hole therein, the short-circuit hole being at a position corresponding to a position of the coupling terminal,
    a short-circuit member covers the short-circuit hole, and
    the short-circuit member is deformable and is configured to contact a bottom side of the coupling terminal in a deformed condition.

17. The secondary battery as claimed in claim 16, wherein:
    the terminal plate includes a third hole having a position corresponding to the position of the short-circuit hole of the cap plate, the third hole including an outwardly bending portion, and
    a lower part of the coupling terminal corresponds in shape of the outwardly bending portion of the third hole, the lower part of the coupling terminal extending toward the cap plate.

18. The secondary battery as claimed in claim 16, wherein:
    a recess is formed in a bottom center part of the coupling terminal, and
    a peripheral surface of the recess extends toward the cap plate.

19. The secondary battery as claimed in claim 16, wherein the coupling terminal is coupled with the terminal plate by riveting or welding.

* * * * *